June 25, 1968     C. A. SARAVIS     3,389,966
APPARATUS AND PROCESS FOR SEMIQUALITATIVE, SEMIQUANTITATIVE
IMMUNODIFFUSION REACTIONS
Filed April 30, 1964

INVENTOR
CALVIN A. SARAVIS

BY Fidelman & Wolffe

ATTORNEYS

United States Patent Office 3,389,966
Patented June 25, 1968

3,389,966
**APPARATUS AND PROCESS FOR SEMIQUALI-
TATIVE, SEMIQUANTITATIVE IMMUNODIFFU-
SION REACTIONS**
Calvin A. Saravis, Waban, Mass.
(281 South St., Jamaica Plain, Mass. 02130)
Filed Apr. 30, 1964, Ser. No. 363,960
7 Claims. (Cl. 23—230)

ABSTRACT OF THE DISCLOSURE

An immunodiffusion test plate and method are shown, wherein a template and a slide plate sandwich an agar film therebetween. The template has an ordered series of apertures therethrough for adding an antigen solution and an antibody solution to the underlying agar film. For serial dilution tests a column of cup-like circular depressions sized for a Takatsy loop parallels a slot aperture. Other cup-like depressions are disposed in an Ouchterlony pattern. A cylindrical bore of restricted diameter passes from the base of each cup-like depression to the opposing surface of the template whereby the cup-like depression and cylindrical bore form an aperture through the template.

---

The present invention relates to an apparatus and procedure for carrying out semiqualitative, semiquantitative immunodiffusion reactions.

Immunodiffusion as a technique has aroused substantial interest for its possible application as a diagnostic and analytical tool. Briefly immunodiffusion involves reactions, e.g., between an antigen and an antibody, effected in semisolid media, commonly agar. Both reactants are initially soluble in the medium or carrier, but the reaction product (or complex) is insoluble and may be observed visually or photographically. For further background on immunodiffusion reference is made to the widespread literature on this subject some of which is listed in the bibliography of the text entitled, "Immunodiffusion," A. J. Crowle, Academic Press, New York (1961).

To fully examine the possible reactions between an antigen and antiserum a serial dilution from antigen excess to antibody excess is essential for best results. Frequently with an excess of either reactant no precipitate results, while at the proper concentration of the two a precipitate will form. When several antigens are to be compared by the Ouchterlony technique using the same antiserum, the optimum concentration of each antigen should first be determined and this antigen concentration placed in the Ouchterlony well. In the same way, the antiserum titer and the maximum spectrum of reactions should be determined.

Specifically, the present invention relates to a technique and apparatus for the facile determination of the immunoprecipitin titer of an antigen antibody reaction and for determining the antigenic similarities between several antigens when each is at its optimum concentration for the precipitin reaction.

According to practice of the present invention, the optimum concentration of each antigen is first determined using a serial dilution of the antigen against the same antiserum concentration. The concentration picked as optimum is where the precipitation line is located between the antigen reservoir and the antibody reservoir; this antigen concentration is placed in the Ouchterlony well. As an example, by using the technique and apparatus described below several commercial antiserums made to human serum have been found to be diluted to a degree that it was probable that a low titer immunoprecipitin reaction seen with a more concentrated antiserum will not occur.

For further understanding of the present invention, reference is now made to the attached drawing wherein.

Figure 1:
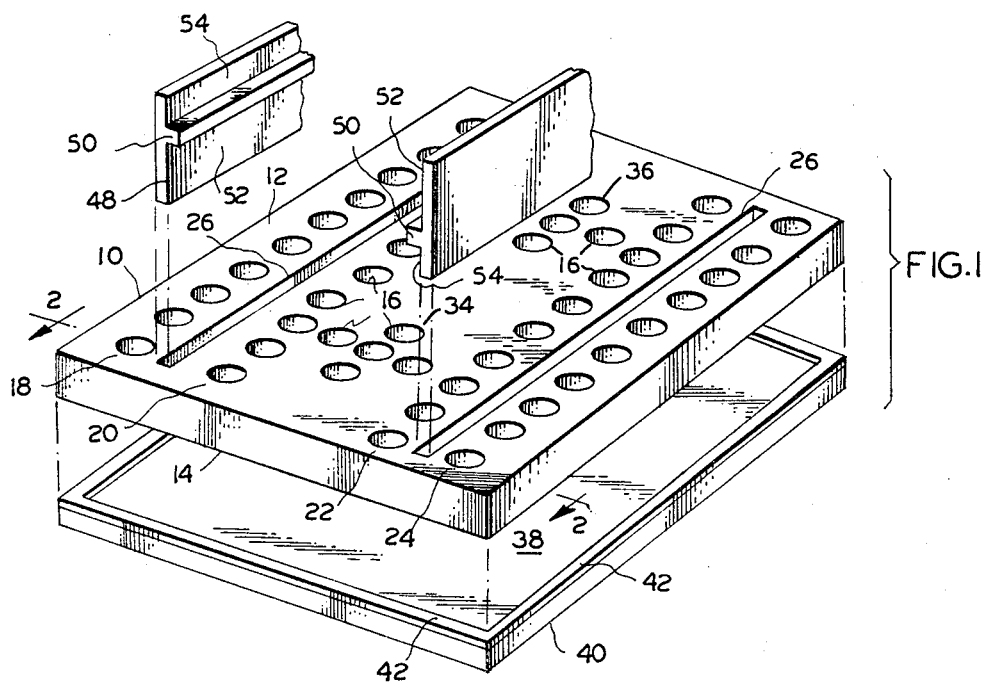
FIG. 1 illustrates an expanded view of the apparatus according to the present invention.
Figure 2:
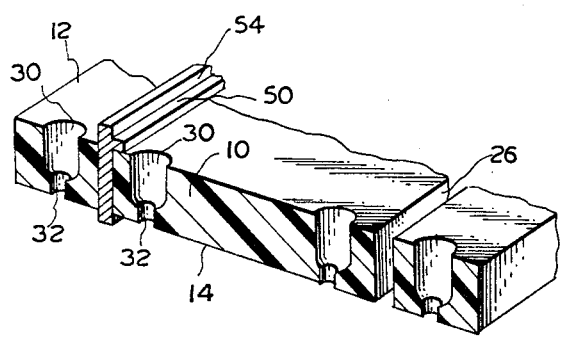
FIG. 2 is an enlarged partial section taken along line 2—2 of FIG. 1.

As seen by the drawing a template 10 (of polycarbonate resin) with smooth planar upper and lower surfaces 12 and 14 is adapted to seat on a glass slide 40. Exemplary dimensions of the template 10 illustrated in the drawing are 83 millimeters wide, 102 millimeters long and 6 millimeters thick. Suitably template 10 (and for that matter slide 40 as well) may be constructed from a transparent autoclavable resin (commercially available polycarbonate resins have proven most satisfactory) although other resins such as polystyrene and acrylic resins (Lucite) may also be employed; also glass is suitable.

A plurality of spaced apart apertures 16 penetrate through from the upper planar surface 12 to lower planar surface 14 of template 10. The nature and inter-relationship of apertures 16 are important to the practice to the present invention.

As shown in the drawing one sequence of identical apertures 16 are arranged in parallel columns 18, 20, 22 and 24. It should be noted how the columns are arranged in pairs, e.g., 18 and 20, 22, and 24. Equidistant between the columns 18 and 20 and also 22 and 24 is a slot-like aperture 26 hereinafter termed a well. Also at least two sets 34 and 36 of apertures 16 are disposed in the central portion of template 10. Each set is arranged in an Ouchterlony pattern, wherein four peripheral apertures are on center around a centrally located aperture.

Each aperture 16 comprises a cup-like depression 30 extending partly through the material of template 10 and a cylindrical bore 32 of restricted diameter extending from the base of cup-shaped depression 30 axially thereof through to the opposing planar surface 14, the cross-sectional area of the restricted passageway being far less than the cross-sectional area of the cup-like depression measured in the plane of intersection of the cylinder and the bottom of the cup.

Figure 3:
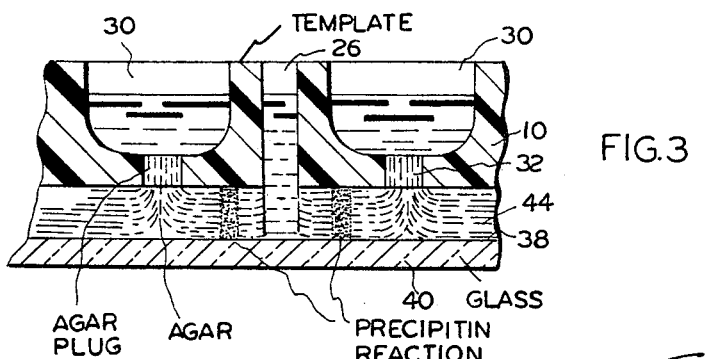
FIG. 3 is an enlarged cross-sectional diagrammatic view showing the assembled template and slide.

The above described template 10 is employed in association with an agar-coated slide 40 suitably a glass lantern slide, in the manner generally shown by FIGS. 1, 3. Lantern slide 40 has of course a planar top surface 38 which for purposes of the present procedure is coated with a semisolid medium 44, e.g., agar. Upstanding peripheral dams 42 extend at least along the side margins of the slide and, preferably, along the top and bottom margins as well. Depending on the desired thickness of the agar or other diffusion media coating placed on the slide, dams 42 may extend as much as one millimeter above the planar surface 38 of slide 40.

As is conventional in immunodiffusion tests the lantern slide 40 is meticulously cleaned and then coated with a suitable water repellant silicone coating (using available commercial materials such as "Siliclad"). A polycarbonate template need only be cleaned meticulously. Thereafter the dams 42 are placed on the slide, they may be suitably preformed rectangles formed from polyvinyl chloride or other non-reactive resins. Alternatively several layers of black plastic electrical tape (Homart, Sears Roebuck) may be wrapped around the slide at the side margins for the dams.

For further understanding of the present invention, the procedure will be given in terms of a preferred embodiment thereof, with a template having the above given dimension and a precleaned, presilicone coated glass lantern slide plate having a dam formed from five (5) layers of black electrical tape around the periphery thereof. To begin with the plate is positioned on a warm surface (a hot plate) and 10 milliliters of hot deaerated agar placed thereon. Alternatively other known media such as gelatin, pectin, or synthetic resin (e.g., Cyanogum 41) may be substituted for the agar. Agar is the most popular gel medium for immunodiffusion work.

After the hot agar or other medium has been cast onto slide plate 40, template 10 is immediately placed thereon sandwiching the agar layer between the template and the slide plate, care being taken to insure that the agar is in a bubble-free state. To avoid evaporation from the agar surface of wells 26 it is desirable to insert an elongated key 48 into wells 26. When the agar has cooled and gelled the agar fills up each bore 32 (1/32" diameter, 1mm. high) with any excess welling up into the base of cup-shaped depressions 30 (1/4" diameter, 5 mm. deep). To whatever extent is permitted by the key 50 agar will have welled up into the bottom of slot aperture 26. When the agar has cooled and gelled the keys are removed from wells 26.

To digress for a moment it should be pointed out that the key 48 is supported by a shoulder 50 that rests on top surface 12 of template 10. If the key is inserted so that the short leg 54 enters well 26, the edge of the key bottom is flush with the lower surface 14 of template 10. If the longer leg 52 is inserted into well 25, the surface of agar will be depressed so that a well-like depression will be formed in the agar film under slot 26. Some workers in the art prefer working with a well in the film itself.

The open apertures 16, namely, the cup-shaped depression 30 and bore 32 receive any excess agar on plate 40. Agar forced up through bore 32 into the cup-shaped depressions 30 can be readily removed therefrom by simply twirling a properly sized spatula therein (the 1/4" spatula just fits cup-shaped depressions 30). After excess agar is removed there remains agar plugs in side bores 32 integrally with the agar layer sandwiched between template 10 and slide 38. By comparison a standard template technique usually involves punching wells out of a cast agar film beneath template openings. The punch technique invariably leads to tears in the side walls of the wells with erratic immunoprecipitin reactions occurring because of the resulting irregularity in the agar. In the present example it so happens that 10 ml. of agar is just right. There is no excess to be removed from depressions 30. The technique of the present invention involves placing one reactant in the cup-shaped depressions 30 and another reactant in wells 26. From depressions 30 the reactant (antibody or serum) diffuses into the agar layer 44 by way of the upstanding agar plug or stud in bore 32. A similar diffusion takes place from the reactant disposed inside slotted apertures or wells 26 (see FIG. 3).

After the agar has gelled and any excess removed from the cup-shaped depressions 30 a drop of buffer, i.e., isotonic sodium chloride solution (0.85%), is put into each aperture and well to saturate the agar. A brisk upside down shake is then used to empty the wells and apertures of any free fluid and the assembly disposed upside down on toweling to remove any remaining buffer. Thereafter the cup-shaped depressions are all loaded with a constant amount of diluent (0.025 ml. or 0.05 ml.) to a suitable level, e.g., as shown in FIGURE 3.

The present apparatus is particularly adapted for carrying out a complex test sequence in which a constant reactant concentration, i.e., antibody, is disposed in wells 26 and a serially diluted serum or antigen is placed individually into the cup-shaped depressions 30 of apertures 16, measuring the immunodiffusion precipitin reaction over a extremely wide concentration range. The cup-shaped depressions 30 are specifically designed to accept the Takatsy loops (0.025 ml. or 0.05 ml.). In the first cup-shaped depression antigen is charged to the diluent with the Takatsy loop (0.05 ml.), the liquid stirred to mix well and the same loop employed to transfer more dilute antigen to the next adjacent depression 30, again stirring until homogenous solution is obtained and again removing an aliquot for charging to the third depression 30 and so on. With ten apertures disposed in each column 18 and 20 exceedingly wide range of concentrations is obtained in this fashion, i.e., $2^{19}$. Even so for every strong reactions the antigen, if greatly in excess, may have to be diluted before loading into the first depression. Simultaneously, the Ouchterlony pattern test may be carried out with the same reactants using the Ouchterlony pattern set 34 and 36. In a single test slide with the same antigen and antibody, the antigen is serially diluted in the depressions 30 of columns 18 and 20, while a constant strength antigen fills well 26 therebetween. Similarly the Ouchterlony patterns are determined for the antigen v. antibody in one group, e.g., 34 and the antibody v. antigen in the other group, e.g., 36.

For different immunoprecipitin reactions the parameters for optimum reactions may be expediently derived by the use of the present apparatus and the above described procedure.

After the reservoirs are loaded with reactants, the assembly is placed in a humid chamber for the development of the precipitin lines. Following full development of the precipitin lines, the plastic template 10 is lifted off the agar layer; the lines may be photographed at this stage, if desired. The unreacted protein, together with the salts and water is removed either by washing in buffered saline solution or by absorption into facial tissue layed atop the agar surface, or by a combination of both. The precipitin lines are then stained, cleared, soaked in 5% glycerine solution, dried, and a mounting medium is placed on the plate and another cover glass placed on top. It may then be photographed and stored as a permanent record.

To further illustrate that the above described technique and equipment can be employed in lieu of test tube dilution techniques, the following comparative test run was made.

Four precleaned Kodak glass lantern slides (3 1/4 x 4"), previously siliconized were attached to a warmed metal level board. Borders 1 mm. high, 1.5 mm. wide had been placed along the marginal edges of the slides.

Deareated agar solution 1.5% agar in phosphate buffer pH 7.4, $0.15\mu$ was pipetted on each slide (10 ml.). Clean plastic templates of the previously given dimensions were carefully lowered on the slides, and keys (lightly siliconized with Dow compound #7) were placed in the well slots in the flush position.

When the agar had gelled, the plates were removed from the level board and the keys taken out. In only one of the plates had agar welled up in the cup-like depressions. This excess was removed with the special 1/4" spatula.

Two of the immunodiffusion plates were used for test tube dilutions. Two tenths of normal human serum were serially diluted by serial dilution with 0.2 ml. of phosphate buffer in each tube for 20 tube dilutions. Melting point capillary tubes (1.5-2.0 mm. I.D.) were used to transfer approximately 0.01 ml. of each dilution to its respective wells. The wells of one of the plates were loaded with Hyland Horse antihuman serum while that of the other plate were loaded with horse antihuman serum produced by the Netherlands Red Cross.

The two remaining plates were used for dilutions made directly in the plate using a Takatsy microtitration loop. Drops of buffer were briefly put in the wells and depressions and then removed by a brisk upside down shaking. 0.025 ml. of buffer was placed in each well, the Takatsy loop (0.025 ml.) loaded with a 1/5 dilution of human serum was placed in the first depression. After twirling, it was transferred to the second depression and in the same manner to the end of the line of depressions and around to the other side of the well. One plate was similarly loaded with the Hyland antiserum while the other with the Netherlands Red Cross antiserum.

The plates were placed in a humid chamber and incubated 24 hours at room temperature. The wells and slots were rinsed with isotonic saline solution, then the template pried off the slide. The plates were placed in isotonic saline pH–7 for three days with several changes of this eluant. Photographs were then taken.

Comparison of the test tube dilution plates with the Takatsy dilution plates showed little if any differences. Both had titers of 1/2000 with the Hyland antiserum and 1/32,000 with the Netherlands Red Cross antiserum. With the latter antiserum many more lines were seen in the first dilutions, showing a broader spectrum of immunoprecipitin reactions.

What is claimed is:

1. A template adapted for immunodiffusion test purposes comprising a planar element containing a plurality of spaced apart apertures therethrough, each aperture being in the form of a cup-like depression extending partly through the planar element and a cylindrical bore of restricted diameter extending axially of the cup-like depression from the base thereof through to the opposing face of the planar element, the cross-sectional area of the restricted passageway being far less than the cross-sectional area of the cup-like depression measured in the plane of intersection of the cylinder and the bottom of the cup, the pattern made by the apertures being in the form of at least one column of apertures, and a slot-like aperture parallel to the column of apertures and closely adjacent thereto.

2. The template of claim 1 wherein a second column of apertures is parallel to the slot-like aperture and closely adjacent thereto, the slot aperture being equidistant between the two columns.

3. The template of claim 1 wherein the template also contains a plurality of apertures disposed in an Ouchterlony pattern.

4. An assembled immunoprecipitin test apparatus comprising: a slide plate said slide plate having on one face thereof a semisolid immunodiffusion medium; a dam around the side marginal edges of said slide, serving to contain the immunodiffusion medium; a template above the immunodiffusion medium sandwiching said medium between the template and the slide, said template comprising a planar element coextensive with the slide and containing therein a plurality of spaced apart apertures, each aperture being in the form of a cup-like depression extending partly through the planar element and a cylindrical bore of restricted diameter extending axially of the cup-like depression from the base thereof through to the opposing face of the planar element, the cross-sectional area of the restricted passageway being far less than the cross-sectional area of the cup-like depression measured in the plane of intersection of the cylinder and the bottom of the cup, the pattern made by the apertures being in the form of at least one column of apertures, and a slot-like aperture parallel to the column of apertures and closely adjacent thereto, the medium extending into the above described cylindrical bores.

5. The apparatus of claim 4 including an elongated key adapted to rest in the slot-like aperture.

6. The method of preparing an immunodiffusion test plate which comprises: coating a liquefied normally semisolid immunodiffusion medium on a slide plate, placing a template atop said slide plate, thereby sandwiching the liquefied medium between the template and slide plate, said template comprising a planar element coextensive with the slide and containing therein a plurality of spaced apart apertures, each aperture being in the form of a cup-like depression extending partly through the planar element and a cylindrical bore of restricted diameter extending axially of the cup-like depression from the base thereof through to the opposing face of the planar element, the cross-sectional area of the restricted passageway being far less than the cross-sectional area of the cup-like depression measured in the plane of intersection of the cylinder and the bottom of the cup, the pattern made by the apertures being in the form of at least one column of apertures, and a slot-like aperture parallel to the column of apertures and closely adjacent thereto; placing an elongated key therein to seal the slot-like aperture, excess medium being forced thereby to well up into the apertures; allowing the liquefied medium to solidify to the semisolid state; removing any excess medium from the cup-shaped depressions, leaving medium in the bore portions of said apertures; and removing the elongated key from the slot-like aperture, whereby the test plate is ready for an immunodiffusion test.

7. A method of conducting an immunodiffusion test which comprises: casting a liquefied normally semisolid immunodiffusion medium on a slide plate; placing a template atop said slide plate, thereby sandwiching the semisolid medium between the template and slide plate, said template comprising a planar element coextensive with the slide and containing therein a plurality of spaced apart apertures, each aperture being in the form of a cup-like depression extending partly through the planar element and a cylindrical bore of restricted diameter extending axially of the cup-like depression from the base thereof through to the opposing face of the planar element, the cross-sectional area of the restricted passageway being far less than the cross-sectional area of the cup-like depression measured in the plane of intersection of the cylinder and the bottom of the cup, the pattern made by the apertures being in the form of at least one column of apertures, and a slot-like aperture parallel to the column of apertures and closely adjacent thereto; placing an elongated key therein to seal the slot-like aperture, any excess medium being forced thereby to well up into the apertures, allowing the liquefied medium to solidify to the semisolid state, removing any excess medium from the cup-shaped depressions, leaving the medium filling the bore portions of said apertures; thereafter charging the apertures with a diluent; then placing a succession of serially diluted reactant charges in the column of apertures; and a constant strength different reactant in the slot-like aperture; and thereafter causing immunodiffusion whereby an immunodiffusion precipitin reaction occurs inside the medium.

References Cited

Crowle, A. J.: Immunodiffusion, Academic Press, New York, 1961. Pages 202 to 223 relied on.

MORRIS O. WOLK, *Primary Examiner.*

R. M. REESE, *Assistant Examiner.*